(12) United States Patent
Allwine

(10) Patent No.: US 6,404,185 B1
(45) Date of Patent: Jun. 11, 2002

(54) APPARATUS AND METHOD FOR SENSING AN ANGULAR POSITION OF A FLUX LINKAGE MEMBER

(75) Inventor: Elmer C. Allwine, Santa Clara, CA (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 09/323,369

(22) Filed: Jun. 1, 1999

(51) Int. Cl.$^7$ .............................. G01B 7/30; G01R 33/06
(52) U.S. Cl. .................. 324/207.2; 324/207.22; 324/207.25
(58) Field of Search .................. 324/207.2, 207.21, 324/207.22, 207.25, 207.24, 207.23, 207.26, 251, 260, 262; 341/15; 338/32 R, 324

(56) References Cited

U.S. PATENT DOCUMENTS

| | | |
|---|---|---|
| 3,112,464 A | 11/1963 | Ratajski et al. |
| 3,162,804 A * | 12/1964 | Parsons ........................ 324/94 |
| 4,142,153 A | 2/1979 | Smith |
| 4,570,118 A | 2/1986 | Tomczak et al. |
| 4,726,338 A | 2/1988 | Decker et al. |
| 4,744,343 A | 5/1988 | Bisenius et al. |
| 4,785,242 A * | 11/1988 | Vaidya et al. ................ 324/208 |
| 4,848,298 A | 7/1989 | Schleupen |
| 4,942,394 A | 7/1990 | Gasiunas |
| 5,055,781 A | 10/1991 | Sakakibara et al. |
| 5,115,239 A | 5/1992 | Ushiyama |
| 5,159,268 A | 10/1992 | Wu |
| 5,258,735 A | 11/1993 | Allwine, Jr. |
| 5,313,159 A | 5/1994 | Allwine, Jr. |
| 5,712,561 A | 1/1998 | McCurley et al. |

* cited by examiner

Primary Examiner—Walter E. Snow
Assistant Examiner—Amber C. Knox
(74) Attorney, Agent, or Firm—Mark P. Bourgeois

(57) ABSTRACT

In a non-contacting angular position sensor (10), an angular positioning of a rotating object, such as a crankshaft, is measured by a Hall effect device (34) that remains stationary in an air gap (33) between two discs (12, 22), both coupled to the rotating object via a shaft (11). A ring magnet (32) is attached to one of the two discs (22) that has a groove (26) therein. The groove (26) varies in width from a wide region (27) to a narrow region (29). There is a transition region (28) between where the groove (26) is narrowest and where it is widest. As the shaft (11) rotates, the Hall effect device (34) senses a magnetic field that varies with the width of the groove (26), thereby measuring the angular position of the rotating object coupled to the shaft (11).

20 Claims, 2 Drawing Sheets

APPARATUS AND METHOD FOR SENSING AN ANGULAR POSITION OF A FLUX LINKAGE MEMBER

FIELD OF THE INVENTION

The present invention relates, in general, to position sensing and, more specifically, relates to non-contacting angular position sensing.

BACKGROUND OF THE INVENTION

Position sensing is used to gain information about an event or a continuously varying condition. Position sensors known in the industry include resistive contacting networks, inductively coupled ratio sensors, variable reluctance devices, capacitively coupled ratio detectors, optical detectors using the Faraday effect, photo-activated ratio detectors, and electrostatic ratio detectors.

There are a variety of known techniques for angular position sensing. Each of these technologies offers a unique set of advantages and limitations. Of these technologies, magnetic sensing is known to have a unique combination of long component life and excellent contamination resistance. In magnetic sensing, a magnetic field dependent on the angular position is sensed and used to measure the angular position.

In the automotive industry, position sensors are widely used to measure crankshaft position in such applications as engine ignition timing. Examples of patents pertinent to the present invention include:

U.S. Pat. No. 5,712,561 to McCurley et al. for a field position sensor with improved bearing tolerance in a reduced space;

U.S. Pat. No. 3,112,464 to Ratajski et al. for a Hall effect translating device;

U.S. Pat. No. 4,142,153 to Smith for a tachometer measuring speed and direction of shaft rotation with a single sensing element;

U.S. Pat. No. 4,293,837 to Jaffe et al. for a Hall effect potentiometer;

U.S. Pat. No. 4,570,118 to Tomczak et al. for an angular position transducer including permanent magnets and Hall effect device;

U.S. Pat. No. 4,726,338 to Decker for a device for controlling internal combustion engines;

U.S. Pat. No. 4,744,343 to Bisenius for a device for controlling an internal combustion engines;

U.S. Pat. No. 4,848,298 to Schleupen for a device for controlling internal combustion engine;

U.S. Pat. No. 4,942,394 to Gasiunas for a Hall effect encoder apparatus;

U.S. Pat. No. 5,055,781 to Sakakibara et al. for a rotational angle detecting sensor having a plurality of magnetoresistive elements located in a uniform magnetic field;

U.S. Pat. No. 5,115,239 to Ushiyama for a magnetic absolute position encoder with an undulating track;

U.S. Pat. No. 5,159,268 to Wu for a rotational position sensor with a Hall effect device and shaped magnet;

U.S. Pat. No. 5,258,735 to Allwine for a multi-pole composite magnet used in a magnetic encoder; and U.S. Pat. No. 5,313,159 to Allwine for a magnetic encoder with composite magnet.

One problem with current electronic ignition systems is that they use variable reluctance (VR) sensors for measuring crank position. Such sensors magnetically detect variable reluctance patterns symmetrically spaced on a magnetic steel gear circumference. The symmetrical spacing is typically arranged in a thirty-six symmetrical, geartooth pattern or ten degree resolution spacing, which by design provides relative mechanical crankshaft position. However, VR crank sensors are not very reliable when they are used to detect ignition misfire events. The lack of reliability is due to poor signal quality, resolution, and external influences (noise) affecting the sensor signal and thereby inducing false misfire events.

In an effort to override the deficiencies of VR crank sensors in detecting ignition misfire events, filtering or masking schemes have been introduced in the misfire algorithm to attempt to determine between a true and a false misfire event. If these algorithms are incorrectly designed or produced, they may fail to meet the stringent California Air Resource Board emission standards. This failure scenario is potentially a large warranty cost burden to both the consumer and the manufacturer.

The obvious advantage for using VR sensors for the ignition and misfire systems is low cost and high sensor durability. Yet, the limitations of using VR sensors is low voltage output at low cranking speeds, which are generally undetectable by the electronic control module at crank speeds at under 30 revolutions per minute (RPM). Other disadvantages of VR sensors for precision, position measurement applications are poor output signal integrity, accuracy, repeatability, and low resolution.

Thus, there is a need for a magnetic sensor, which can identify cylinder position at or below 15–20 RPM. Such a sensor would improve emission control at engine ignition start, and can also improve the crankshaft position identification response times. Further, there is a need to provide a magnetic sensor that will be conducive to extreme automobile environments and that is adaptable to present electronic control modules. These, and other identified needs, are satisfied by the present invention.

SUMMARY OF THE INVENTION

The present invention provides a non-contacting angular position sensor capable of high resolution, precise, and absolute angular positioning in static conditions. In accordance with a preferred embodiment of the present invention, the angular position of a rotating object, such as a crankshaft, is measured by magnetic field sensor, e.g., a Hall effect device, that remains stationary in an air gap between two flux linkage members, both coupled to a shaft. The shaft, in turn, is coupled to the rotating object whose angular position is to be measured. A ring magnet is attached to at least one of flux linkage members. The Hall effect device is aligned with the ring magnet so that the strength of the magnetic field can be sensed at all angular positions. One flux linkage member has a groove therein. The groove varies in width from a wide region to a narrow region. There is a transition region between where the groove is narrowest and where it is widest. As the shaft rotates, the Hall effect device senses a magnetic field that varies with the width of the groove in the flux linkage member. The Hall effect device produces an output waveform in accordance with the magnetic field.

There has thus been outlined, rather broadly, the more important features of the invention so that the detailed description thereof may be better understood. Those skilled in the art will appreciate that the preferred embodiment may readily be used as a basis for designing other structures, methods and systems for carrying out the several purposes of the present invention. It is important, therefore, that the claims are regarded as including such equivalent constructions since they do not depart from the spirit and scope of the present invention.

BRIEF DESCRIPTION OF THE DRAWINGS

The preferred embodiments of the present invention will hereinafter be described in conjunction with the appended drawings, where like designations denote like elements, and.

It is noted that the drawings of the invention are not to scale and the drawings are merely schematic representations, not intended to portray specific parameters of the invention.

DETAILED DESCRIPTION OF THE PREFERRED EMBODIMENTS

Figure 1:
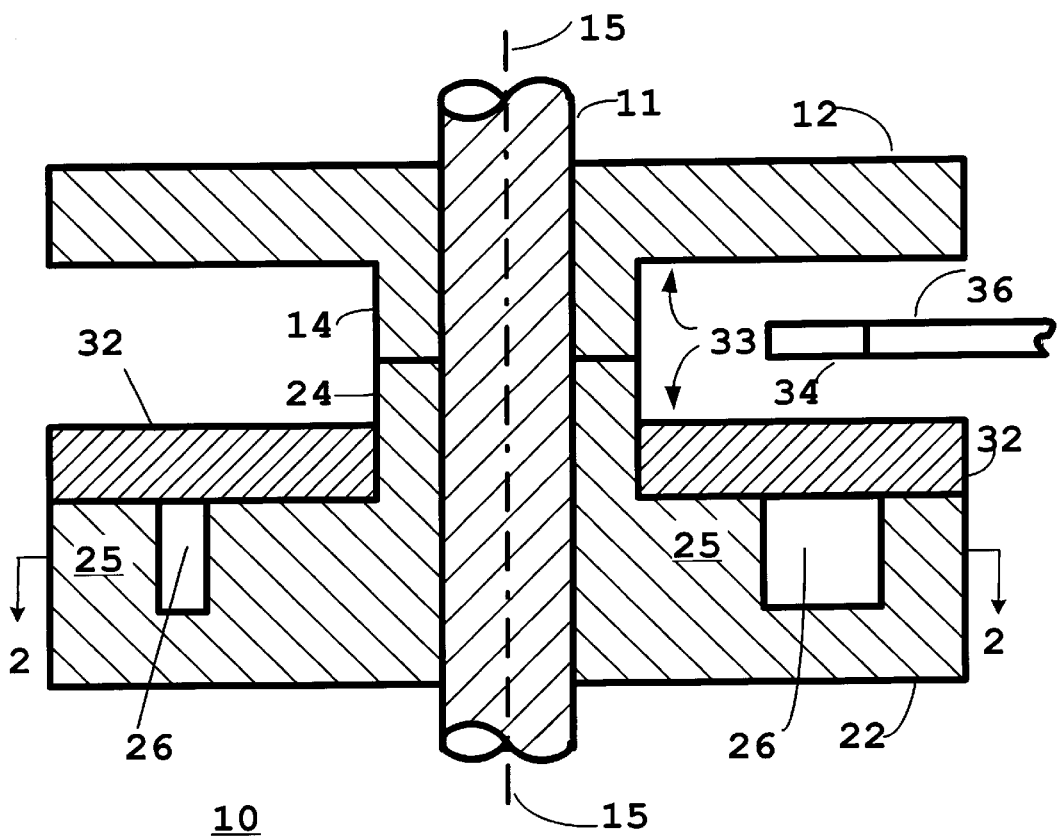
FIG. 1 is a cross sectional view of a non-contacting angular position sensor in accordance with the present invention.
Figure 2:
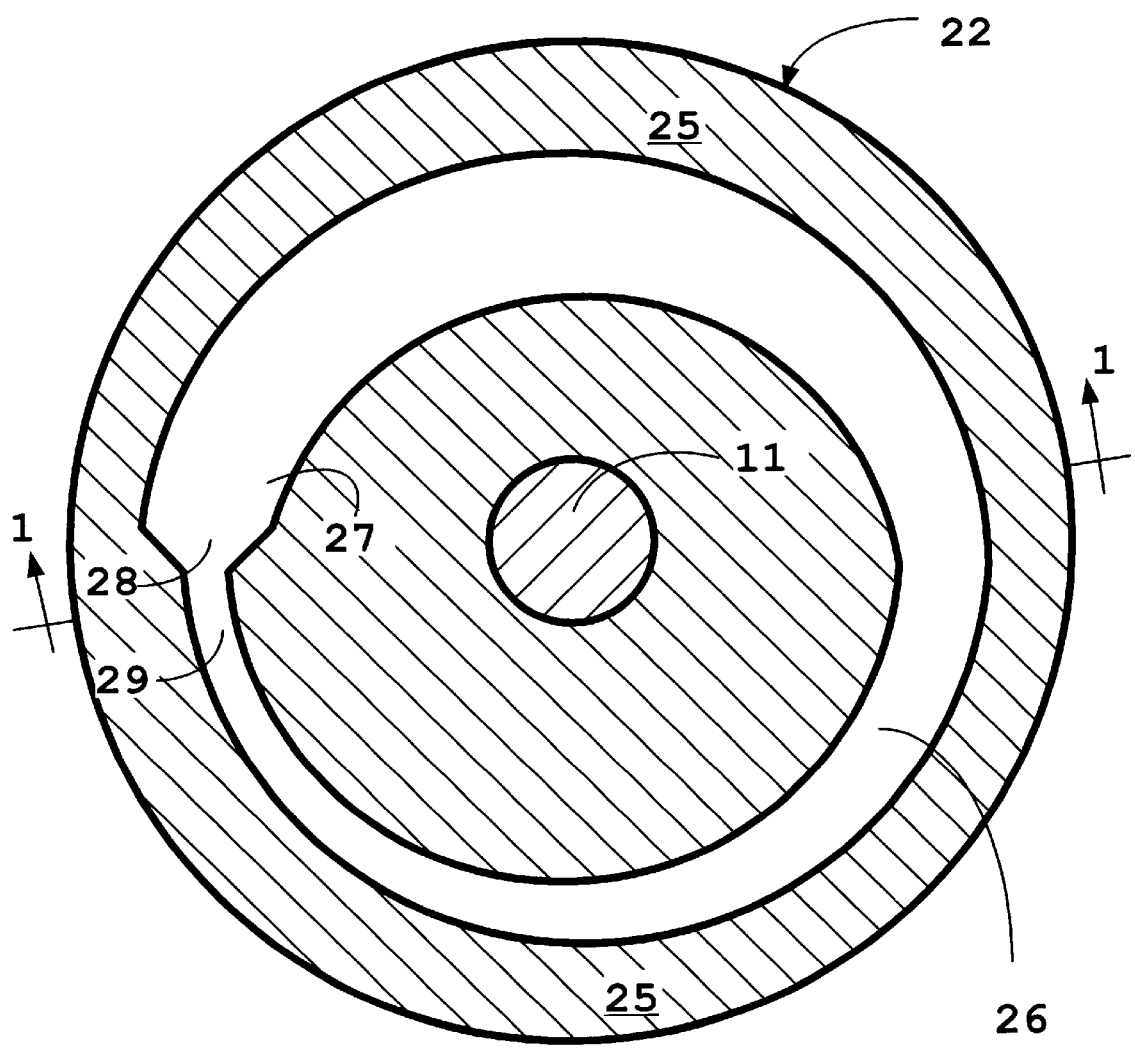
FIG. 2 is a cross sectional view of a portion of the angular position sensor along a cross section 2—2 shown in FIG. 1.

FIG. 1 is a cross sectional view of a non-contacting angular position sensor 10 in accordance with the present invention. Position sensor 10 includes discs 12 and 22 coupled to a rotatable shaft 11. Shaft 11 is adapted to be coupled to a rotating object (not shown) such as, for example, a motor shaft, a crankshaft, or a throttle body on a fuel injection system. Shaft 11 rotates about an axis of rotation 15 as the rotating object rotates. An inner portion 14 of disc 12 serves as a hub of disc 12 and is connected to shaft 11. Likewise, an inner portion 24 of disc 22 serves as a hub of disc 22 and is connected to shaft 11. Preferably, hubs 14 and 24 are in contact with each other. A depression or groove 26 surrounding hub 24 is formed in an outer portion 25 of disc 22. Groove 26 is substantially concentric with shaft 11 and hub 24. Referring to FIG. 2 which is a cross sectional view of disc 22 along a cross section 2-2 shown in FIG. 1, groove 26 has a varying width along an angular position in disc 22. More particularly, the width of groove 26 decreases gradually from a maximum width in a wide region 27 to a minimum width in narrow region 29, and increases abruptly to the maximum width over a transition region 28 in groove 26.

Referring back to FIG. 1, position sensor 10 also includes a permanent magnet 32 attached to disc 22. In an embodiment, magnet 32 is a ring shaped magnet surrounding hub 24 and overlying groove 26 in outer portion 25 of disc 22. Ring magnet 32 preferably has a substantially uniform width and a substantially uniform thickness: In addition, magnet 32 is preferably magnetized or polarized in a direction substantially perpendicular to disc 22 or substantially parallel to shaft 11. By way of example, magnet 32 is a Barium Ferrite magnet. Discs 12 and 22 are magnetically permeable and function as magnetic flux linkage members. Preferably, discs 12 and 22 are formed out of a conventional low carbon steel, such as 1018 cold rolled or ancor steel. Alternatively, discs 12 and 22 can be molded out of powdered metal.

Position sensor 10 also includes a Hall effect device 34 attached to a printed circuit board 36. Hall effect device 34 remains stationary at a field position in an air gap 33 and overlying groove 26 in disc 12 while discs 12 and 22 rotate around axis 15. Hall effect device 34 is preferably a conventional Hall effect sensor, such as a Siemens model KSY144. Printed circuit board 36 connects Hall effect device 34 to external circuitry (not shown). Hall effect device 34 senses the magnetic field and generates an output signal accordingly. By way of example, Hall effect device 34 generates a voltage signal proportional to the magnetic field at the field position in air gap 33.

As the object (not shown) coupled to shaft 11 turns, discs 12, ring magnet 32, and disc 22 rotate relative to Hall effect device 34. A closed magnetic path exists when the magnetic flux generated by ring magnet 32 is confined within a high permeability material in discs 12 and 22. Specifically, the magnetic flux primarily flows from ring magnet 32, through disc 22, hub 24, hub 14, disc 12, across air gap 33, and back to ring magnet 32, thereby completing the flux path. Hubs 24 and 14 form a primary flux return path that provides a short flux return path and keeps the magnetic flux concentrated at a higher level.

As shaft 11 turns, the width of groove 26 under Hall effect device 34 varies. If shaft 11 rotates in one direction so that the width of groove 26 adjacent Hall Effect device 34 gradually decreases, the magnetic flux adjacent Hall effect device 34 becomes increasingly concentrated. Therefore, Hall effect device 34 senses an increasingly strong magnetic field. When narrow region 29 is directly under Hall effect device 34, Hall effect device 34 senses a maximum magnetic field. When transition region 28 in groove 26 rotates to a position substantially directly under Hall effect device 34, the magnetic field at the field position of Hall effect device 34 decreases abruptly. Hall effect device 34 senses a minimum magnetic field when wide region 27 is under Hall effect device 34. The minimum magnetic field in air gap 33 near Hall effect device 34 depends on the configuration and magnetic characteristics of position sensor 10. Hall effect device 34 sends out an output signal in accordance with the sensed magnetic field. Preferably, the magnitude of the output signal is proportional to the magnetic field at the field position. Therefore, the angular position of disc 22 can be measured by measuring the output signal of Hall effect device 34.

Figure 3:
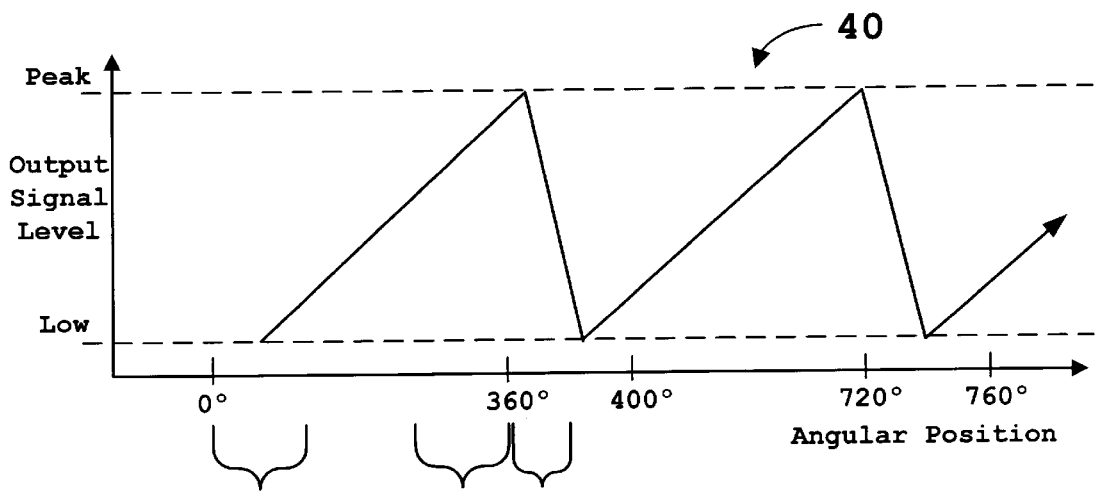
FIG. 3 is a graph illustrating a relation between an output signal of the angular position sensor shown in FIG. 1 and an angular position to be measured in accordance with the present invention.

Referring now to FIG. 3, a graph 40 of output signal level versus the angular position of disc 22 is illustrated. By way of example, the output signal is a voltage signal substantially proportional to the magnetic field sensed by Hall effect device 34. However, it should be understood that this is not intended as a limitation of the present invention. Depending on the circuitry coupled to Hall effect device 34, the output signal can be either a voltage signal or a current signal and can have any kind of monotonic relation with the magnetic field sensed by Hall effect device 34. When plotted as a function of the angular position, the output signal of position sensor 10 has a generally sawtooth shape. Those skilled in the art will recognize that the output from position sensor 10 is usually connected to conventional signal processing electronics for amplification, filtering, etc.

When wide region 27 in groove 26 is directly below the field position of Hall effect device 34, the angular position is defined as 0 degree (°). If shaft 11 starts to rotate from 0°, the voltage rises generally linearly as the width of groove 26 under Hall effect device 34 decreases. As shaft 11 continues to spin pass narrow region 29 in groove 26, transition region 28 moves under Hall effect device 34. The sudden increase in the width of groove 26 in transition region 28 results in a drop-off in voltage signal. As the width of groove 26 adjacent Hall effect device 34 starts to increase again, the cycle repeats itself for the next rotation from 360° to 720°, then again from 720° to 1080°, and so on. In this way, the waveform output shown in graph 40 is produced, with the voltage increasing from a low to a peak for each 360° rotation, and with a fast fall transition at each revolution.

If shaft 11 rotates in an opposite direction, the width of groove 26 under Hall effect device 34 increases gradually from narrow region 29 to wide region 27, then abruptly decreases over transition region 28. Consequently, the output signal of Hall effect device 34 will decrease gradually from a peak value to a low value. The gradual decrease is followed by a sudden increase in the output signal.

Therefore, position sensor 10 allows the continuous position sensing of a continuously rotating object using a variable magnetic field. By sensing the output of Hall effect device 34, the angular position of disc 22 can be measured to an accuracy of approximately 0.1°. The accuracy of the angular position measurement does not depend on the rotation speed of shaft 11. Consequently, position sensor 10 is capable of angular position measurement at both high and low rotation speeds. It is understood that there are magnetic losses in any magnetic flux path from fringing flux and other loss sources. The rotation of magnet 32 simultaneously with the discs 12 and 22 allows for the elimination of eddy current and their unwanted effects.

It should be understood that the structure of position sensor 10 is not limited to that described herein above. For example, shaft 11 and discs 12 and 22 can be made out of any magnetically permeable material, such as cast iron. Similarly, even though the embodiment discusses the use of a Barium Ferrite magnet as magnet 32, those skilled in the art of magnet design will understand that most any magnet could work, like a Samarium Cobalt magnet. Ring magnet 32 is not limited to being a close ring. In an alternative embodiment, ring magnet 32 has a slot overlying transition region 28 in groove 26. The slot in ring magnet 32 serves to improve the peak signal transition from a high level to a low level or vice versa. Additionally, while the magnetic field sensor 34 is shown as a Hall effect device, other types of sensors could be utilized, e.g., magnetoresistive sensors. Also, even though one Hall sensor illustrated, two or more Hall sensors could be used.

Although FIG. 1 shows hubs 14 and 24 as integral parts of discs 12 and 22, respectively, this is not intended as a limitation of the present invention. In an alternative embodiment, hub 14 is a separate part from disc 12 and hub 24 is a separate part from disc 22. Hubs 14 and 24 couple discs 12 and 22, respectively, to shaft 11. Furthermore, hubs 14 and 24 are optional in position sensor 10. In another alternative embodiment, discs 12 and 22 are directly connected to shaft 11. In yet another alternative embodiment, shaft 11, and discs 12 and 22 are integrally formed as a single piece of a magnetic permeable material.

By now it should be appreciated that an apparatus and a method for sensing an angular position have been provided. The angular position sensing apparatus uses a magnetic permeable disc having a varying width groove as a part of a magnetic flux path. As the disc rotates, the width of the groove adjacent a field position varies. The angular position of the disc with respect to the field position can be determined by sensing the magnetic field at the field position. The magnetic field sensing device does not contact any moving part in the apparatus. Therefore, the apparatus is reliable and durable. In addition, the angular position sensing process of the present invention is simple, reliable, and accurate. The sensing process is suitable for both high speed and low speed rotation applications.

What is claimed is:

1. An apparatus for sensing an angular position, comprising:
    a) a shaft;
    b) a disc coupled to said shaft;
    c) a flux linkage member coupled to said shaft and having a depression therein, the depression being substantially concentric with said shaft and having a varying width along an angular position on said flux linkage member;
    d) a magnet attached to said flux linkage member, overlying the depression therein, and adjacent to said disc; and
    e) a magnetic field sensor positioned between said magnet and said disc, said magnetic field sensor generating an output signal in accordance with a relative angular position of said flux linkage member with respect to said magnetic field sensor.

2. The apparatus as claimed in claim 1, wherein said magnet is a ring shaped magnet having a substantially uniform thickness and a substantially uniform width.

3. The apparatus as claimed in claim 1, wherein the varying width of the depression in said flux linkage member decreases gradually from a maximum width in a wide region in the depression to a minimum width in a narrow region in the depression and increases abruptly over a transition region in the depression.

4. The apparatus as claimed in claim 3, wherein said magnet includes a ring shaped magnet overlying the depression in said flux linkage member, said ring shaped magnet having a slot positioned over the transition region in the depression in said flux linkage member.

5. The apparatus as claimed in claim 1, further comprising:
    a first hub coupled between said disc and said shaft; and
    a second hub coupled between said flux linkage member and said shaft.

6. A method for sensing an angular position, comprising the steps of:
    a) providing a flux linkage member having a groove substantially concentric with the flux linkage member, the groove having a varying width along an angular position in the flux linkage member;
    b) generating a magnetic field substantially perpendicular to the flux linkage member and varying in accordance with the width of the groove in the flux linkage member;
    c) sensing the magnetic field at a field position, the magnetic field at the field position depending on the width of the groove in the flux linkage member adjacent the field position; and
    d) generating an output signal in accordance with the magnetic field at the field position.

7. The method as claimed in claim 6, further comprising the steps of coupling the flux linkage member to a rotatable shaft.

8. The method as claimed in claim 7, wherein the step of generating a magnetic field includes the steps of:
    attaching a magnet to the flux linkage member, the magnet overlying the groove in the flux linkage member;
    coupling a disc to the rotatable shaft adjacent the magnet, the disc and the magnet defining an air gap there between; and
    establishing a magnetic flux path through the magnet, the flux linkage member the disc, and the air gap between the disc and the magnet.

9. The method as claimed in claim 8, wherein the step of sensing the magnetic field at a field position includes sensing the magnetic field at the field position in the air gap between the disc and the magnet.

10. The method as claimed in claim 6, wherein the step of generating an output signal includes generating a voltage signal substantially proportional to the magnetic field at the field position.

11. An angular position sensor, comprising:
   a) a first disc having a groove surrounding an inner portion of said first disc, the groove having a varying width;
   b) a magnet over said first disc;
   c) a second disc coupled to said first disc and over said magnet; and
   d) a magnetic field sensor positioned between said second disc and said magnet.

12. The angular position sensor of claim 11, wherein said magnet is attached to said first disc and overlies the groove in said first disc.

13. The angular position sensor of claim 12, wherein said magnet is a ring shaped magnet having a substantially uniform thickness and a substantially uniform width.

14. The angular position sensor of claim 11, wherein said magnet is magnetized in a direction substantially perpendicular to said first disc.

15. The angular position sensor of claim 11, wherein the varying width of the groove in the said first disc decreases gradually from a maximum width in a wide region in the groove to a minimum width in a narrow region in the groove and increases abruptly over a transition region in the groove.

16. The angular position sensor of claim 11, wherein the groove in said first disc is substantially concentric with said first disc.

17. The angular position sensor of claim 11, wherein said magnetic field sensor overlies the groove in said first disc.

18. The angular position sensor of claim 11, further comprising a shaft coupled to said first disc and to said second disc.

19. The angular position sensor of claim 18, further comprising a hub made of a magnetic permeable material, said hub coupling said first disc to said shaft.

20. The angular position sensor of claim 18, further comprising a hub made of a magnetic permeable material, said hub coupling said second disc to said shaft.

* * * * *